June 19, 1928.
T. CARTER
VAMP EASER
Filed April 27, 1927
1,674,500
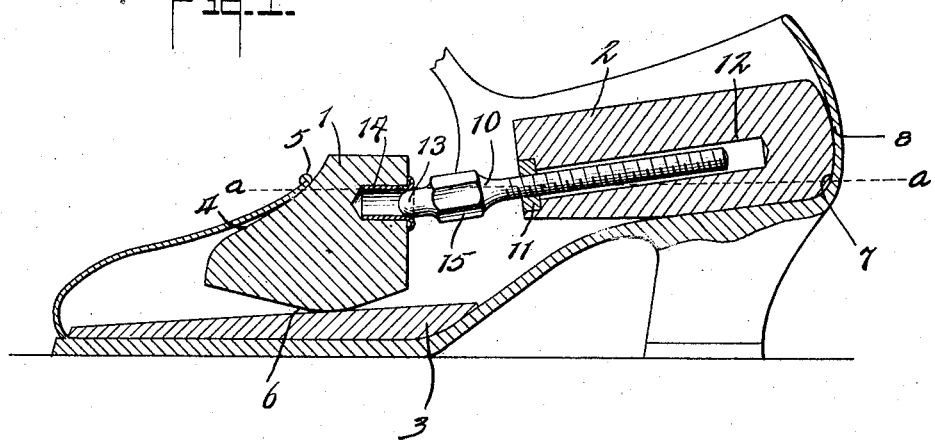
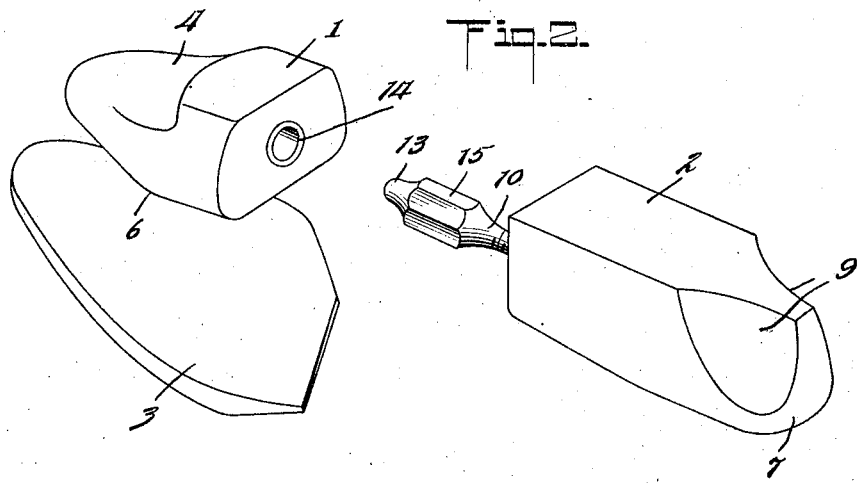
Inventor
THEODORE CARTER June 19, 1928.
H. C. DADANT
1,674,501
REENFORCEMENT FOR BEE COMBS AND COMB FOUNDATIONS
Filed Nov. 23, 1921  2 Sheets-Sheet 2
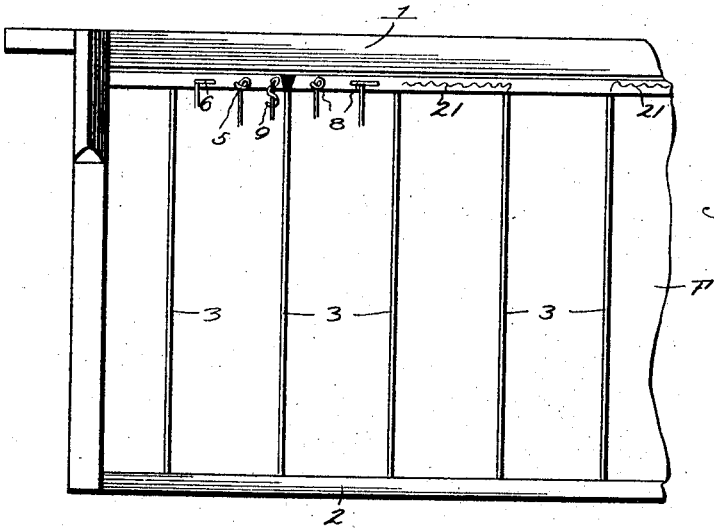
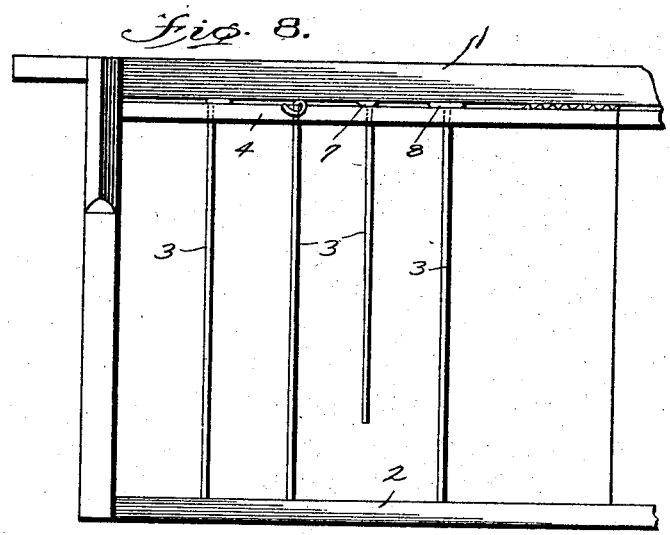
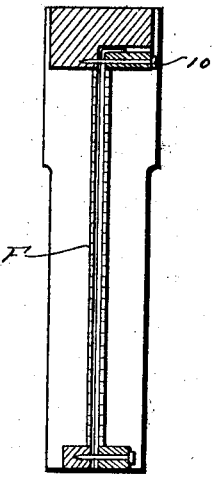
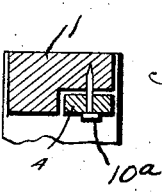
WITNESSES
INVENTOR
H. C. Dadant,
BY
ATTORNEYS Patented June 19, 1928.

1,674,501

UNITED STATES PATENT OFFICE.

HENRY C. DADANT, OF HAMILTON, ILLINOIS.

REENFORCEMENT FOR BEE COMBS AND COMB FOUNDATIONS.

Application filed November 23, 1921. Serial No. 517,345.

My invention relates to improvements in reenforcements for bee combs and bee comb foundations and has for its object to provide reenforcements of the character specified to prevent sagging and consequent distortion and breaking down of bee combs and comb foundations on account of atmospheric changes, weight of the comb, honey, pollen, brood and unhatched bees and on account of the stresses and strains on the foundation and comb during handling and transportation.

In the drawings forming a part thereof,

Figure 1 is a view showing in elevation several forms of reenforcing bars or rods provided with end fastening means, Figure 2 is another form of bar and its location with respect to the cells of the foundation or comb, Figure 3 is a similar view of the bar of slightly varied form and its adaptation, Figure 4 is a view showing the bar disposed in another relation with respect to the foundation, Figure 5 is a view showing reenforcing bars made in continuous and angular and bent lengths, Figure 6 is a view showing another arrangement of reenforcing elements, Figure 7 is a side elevation of a comb frame showing manner of securing the ends of various bars, Figure 8 is a similar view of a frame showing manner of securing ends of rods between the top or bottom frame bars and the wedge bar, Figure 9 is a vertical transverse section showing one method of securing the wedge bar, Figure 10 is a fragmentary section showing another method of securing the wedge bar.

As is well known honey combs built on artificially constructed comb foundations, frequently sag and become distorted and break down because of lack of reenforcement, and also because of sagging or breaking down of the foundation.

The weight of comb, bees, honey, pollen, brood, and young unhatched bees, and the heat of the atmosphere causes this sagging, distortion and breaking down, as well as the stresses and strains on the comb foundations and honey combs during handling and transportation.

In the present embodiments of my invention the frame comprises the usual top member 1 and bottom member 2, and suspended between them are the reenforcing bars generally designated by reference numeral 3.

These bars are to be secured in both top and bottom members when they are of such length as to extend from these members, and are arranged at suitable intervals from end to end of the frames.

Where the reenforcing bars are of such length as to extend part way between the top and bottom members, they are secured only to the upper part of the frame and this is done by either pinching them into the top member 1 or the wedge bar 4, or by securing them in the top member by means of wedge bar, as shown in Figures 8, 9 and 10.

To accomplish this result I have devised several forms of bars as shown in Figure 1 and provided at their upper ends enlargements or offsets. Thus the bars 3 which may be straight or crimped have their upper ends provided with loops 5 offset portions 6 enlargements 7, crossheads 8, or a spiral coil as 9. These modified heads can be pinched into the top member of the frame, or they can be secured therein by rabbeting the top member and securing the ends of the bars in the rabbets by means of the wedge bars 4, these wedge bars securing the comb foundation F usually made from a wax like sheet and the ends of the reenforcing bars, by being forced into place and held by the nails 10 or 10a.

The reenforcing bars may be imbedded in the sheets of comb foundation, and this arrangement presents particular novelty as the bars may be crimped in such manner or bent to form angles, so that they will follow cell walls and cell bases, alternately crossing the cells through the center, or approximately the center following the cell bases, and then the adjoining cell walls to the next cell, crossing this next cell through the center as before and so on. This form is illustrated in Figure 2 in which the reenforcing bar is indicated by the reference numeral 11 and the foundation cells by 12.

As shown in Figure 3, the reenforcing bars 13 may be so formed and disposed that they will follow the cells 14 by crossing to one side of the center from one cell to the next and in this way never follow a cell wall, but only crossing cell walls, and following cell bases.

In either of these forms just described the plane of the bent bar must be placed at right angles to the plane of the sheet of comb foundation, or nearly so. But the bars may also be crimped or bent so that they will not be placed at right angles, but at an acute angle with the sheet or comb foundation.

The bars 15, see Figure 4, may also be crimped or bent to such shape as to follow the cell walls of 16 only preferably following the cell walls between two rows of cells, although indeed this winding back and forth between cells may well be done among more than two rows of cells with equally good effect. In this case the planes of the crimped bar are placed parallel with the sheet of comb foundation, or nearly so, but it may also be placed at an acute angle with good results, see Figure 2.

As shown in Figure 5, the reenforcing element 17 may be a continuous bar formed with a series of loops 18 portions of which may be straight as at 19 and portions roughened as at 20, or it may be made into a closed loop as indicated at the right of such figure. In this form the upper and lower cross bars of the loops are secured to the top and bottom members of the frame.

In Figure 6 the reenforcing means may comprise corrugated or roughened top and bottom rods 21 and between which the vertical smooth rods 22 extend, the top and bottom rods being secured to the upper and lower members 1 and 2 of the frame.

A special advantage is derived from imbedding the reenforcing bars to follow the wall of the cells or cell bases, as they will be more perfectly imbedded in the texture of the comb or comb foundation and in that way produce very little or no obstruction to the honey bees when they are occupying same, as when the reenforcing bars are placed at random they may in some cases cause obstruction to the honey bees when placed on same, particularly so if they happen to cross open spaces or cells where honey, eggs, or young bees are meant to be deposited.

It is of prime importance that the reenforcing bars or rods furnish a support between the horizontal and vertical and this I accomplish by the various forms shown so that sagging is prevented not only at the center of the sheet but at all parts of the sheet of comb.

By the use of the reenforcing bars as hereinbefore described, the honeycomb or comb foundation is reenforced to the very best advantage and practically perfectly so, because by the use of reenforcing bars made with notches, shoulders, projections, ledges, or roughened portions as described, the support radiates in every direction from the horizontal to the vertical, i. e.; every angle from the horizontal or zero to 90°.

These angles of support of varying degrees give a support for the bee comb or foundation in every direction in which support is needed, from every part of the bee comb or comb foundation onto the reenforcing bars.

By reference to Figures 8, 9 and 10 it will be noted that the specially formed ends or ordinary formed crimped or otherwise formed bars 3 may extend a little farther up into the top frame bar and be caught back of the wedge bar 4 which is held in place by nails 10 or 11 applied as shown. This makes a better fastening than the mere "pinching" of the reenforcing bars. The ends of the bars 3 may be enlarged in any manner desired, as shown from the various forms in Figure 1, and may take the form of a loop, a crimped portion, or a flattened or thickened portion so that such enlargements when properly imbedded will maintain the bars against displacement.

I claim:—

1. A reenforcement for comb and comb foundations consisting of a bar adapted to be imbedded in the comb, said bar corrugated to present the same angle as the bases of the comb cells in which the said bar is imbedded.

2. A comb of plastic material comprising a sheet of cellular formation, and corrugated bars imbedded in said sheet, the corrugations thereof coinciding with the bases of the cells and crossing the walls of said cells.

HENRY C. DADANT.